United States Patent
Seo et al.

(10) Patent No.: US 10,326,579 B2
(45) Date of Patent: *Jun. 18, 2019

(54) METHOD AND APPARATUS FOR RECEIVING ACK/NACK IN WIRELESS COMMUNICATION SYSTEM

(71) Applicant: LG ELECTRONICS INC., Seoul (KR)

(72) Inventors: Dong Youn Seo, Anyang-si (KR); Han Byul Seo, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

This patent is subject to a terminal disclaimer.

(21) Appl. No.: 15/803,554

(22) Filed: Nov. 3, 2017

(65) Prior Publication Data

US 2018/0062818 A1    Mar. 1, 2018

Related U.S. Application Data

(63) Continuation of application No. 14/350,551, filed as application No. PCT/KR2012/009142 on Nov. 1, 2012, now Pat. No. 9,843,430.

(Continued)

(51) Int. Cl.
*H04W 72/04* (2009.01)
*H04L 5/00* (2006.01)
(Continued)

(52) U.S. Cl.
CPC .......... *H04L 5/0055* (2013.01); *H04L 1/1861* (2013.01); *H04L 1/1864* (2013.01);
(Continued)

(58) Field of Classification Search
None
See application file for complete search history.

(56) References Cited

U.S. PATENT DOCUMENTS 7,751,499 B2 * 7/2010 Olsson ................ H04B 1/7103
375/316
9,306,712 B2    4/2016 Zhang et al.
(Continued)

FOREIGN PATENT DOCUMENTS

CN          101662833 A      3/2010
EP          1507352          2/2005
(Continued)

OTHER PUBLICATIONS

Siemens, "E-DCH—Collection of RAN3 specific todo's (revision of R3-041355)," TSG-RAN Working Group 3 meeting #44, Tdoc R3-041383, XP050157126, Oct. 2004, 5 pages.

(Continued)

*Primary Examiner* — Sai Aung
(74) *Attorney, Agent, or Firm* — Lee Hong Degerman Kang & Waimey

(57) ABSTRACT

Provided are a method and an apparatus for a user equipment, which is allocated a plurality of serving cells, receiving acknowledgement/negative acknowledgement (ACK/NACK) in a wireless communication system. The method comprises: transmitting uplink data through a physical uplink shared channel (PUSCH); and receiving ACK/NACK with respect to the uplink through a physical hybrid-ARQ indicator channel (PHICH), wherein a serving cell that receives the ACK/NACK is selected from one or more serving cells, which the user equipment monitors to detect an uplink grant that schedules the PUSCH.

8 Claims, 17 Drawing Sheets

Related U.S. Application Data

(60) Provisional application No. 61/650,989, filed on May 23, 2012, provisional application No. 61/594,387, filed on Feb. 3, 2012, provisional application No. 61/554,470, filed on Nov. 1, 2011.

(51) Int. Cl.
*H04L 1/18* (2006.01)
*H04W 72/12* (2009.01)

(52) U.S. Cl.
CPC .......... *H04L 1/1867* (2013.01); *H04L 1/1893* (2013.01); *H04L 1/1896* (2013.01); *H04L 5/003* (2013.01); *H04W 72/042* (2013.01); *H04W 72/1289* (2013.01)

(56) References Cited

U.S. PATENT DOCUMENTS

| | | | |
|---|---|---|---|
| 2004/0043784 A1* | 3/2004 | Czaja | H04W 52/32 455/522 |
| 2005/0068990 A1* | 3/2005 | Liu | H04J 3/0682 370/516 |
| 2006/0079264 A1* | 4/2006 | Gu | H04W 52/12 455/522 |
| 2008/0253326 A1 | 10/2008 | Damnjanovic | |
| 2008/0282126 A1 | 11/2008 | Chindapol et al. | |
| 2009/0259909 A1 | 10/2009 | Luo | |
| 2010/0070816 A1 | 3/2010 | Park et al. | |
| 2010/0195583 A1 | 8/2010 | Nory et al. | |
| 2010/0238873 A1* | 9/2010 | Asanuma | H04L 5/0007 370/329 |
| 2011/0170496 A1 | 7/2011 | Fong et al. | |
| 2011/0249619 A1 | 10/2011 | Yu et al. | |
| 2012/0026935 A1 | 2/2012 | Park et al. | |
| 2012/0113945 A1 | 5/2012 | Moon et al. | |
| 2012/0250663 A1 | 10/2012 | Han et al. | |
| 2014/0348091 A1 | 11/2014 | Seo et al. | |

FOREIGN PATENT DOCUMENTS

| | | |
|---|---|---|
| EP | 2352266 A2 | 8/2011 |
| EP | 2375607 | 10/2011 |
| JP | 2011-211494 | 10/2011 |
| KR | 10-2011-0010681 A | 2/2011 |
| KR | 10-2011-0073334 A | 6/2011 |
| KR | 10-2011-0096482 A | 8/2011 |
| WO | 2010/120159 | 10/2010 |
| WO | 2010145607 A1 | 12/2010 |
| WO | 2011018952 A1 | 2/2011 |
| WO | 2011/049368 | 4/2011 |
| WO | 2011/062384 | 5/2011 |
| WO | 2011078568 A2 | 6/2011 |

OTHER PUBLICATIONS

3rd Generation Partnership Project (3GPP), "Technical Specification Group Radio Access Network; Physical Layer Procedures (FDD) (Release 9)," 3GPP TS 25.214 V9.6.0, XP050553361, Jun. 2011, 99 pages.

Qualcomm Europe, "Hard Aspects of E-DCH," 3GPP TSG-RAN WG1 #37, R1-040540, XP050098899, May 2004, 2 pages.

NTT DoCoMo, et al., "Macro diversity impact analysis," Joint 3GPP TSG RAN WG2 & WG3 LTE session, R3-051102, XP050158532, Oct. 2005, 6 pages.

European Patent Office Application Serial No. 12846167.0, Search Report dated Apr. 24, 2015, 10 pages.

European Patent Office Application Serial No. 12846167.0, Search Report dated Oct. 5, 2015, 22 pages.

Siemens, "E-DCH—Collection of RAN3 specific todo's (revision of R3-041355)," TSG-RAN Working Group 3 meeting #44, Tdoc R3-041383, Oct. 2004, 5 pages.

NTT DoCoMo, et al., "Macro diversity impact analysis," Joint 3GPP TSG RAN WG2 & WG3 LTE session, R3-051102, Oct. 2005, 6 pages.

\* cited by examiner

METHOD AND APPARATUS FOR RECEIVING ACK/NACK IN WIRELESS COMMUNICATION SYSTEM

CROSS-REFERENCE TO RELATED APPLICATIONS

This application is a continuation of U.S. patent application Ser. No. 14/350,551, filed on Apr. 8, 2014, now U.S. Pat. No. 9,843,430, which is the National Stage filing under 35 U.S.C. 371 of International Application No. PCT/KR2012/009142, filed on Nov. 1, 2012, which claims the benefit of U.S. Provisional Application Nos. 61/650,989, filed on May 23, 2012, 61/594,387, filed on Feb. 3, 2012, and 61/554,470, filed on Nov. 1, 2011, the contents of which are all hereby incorporated by reference herein in their entirety.

BACKGROUND OF THE INVENTION

Field of the Invention

The present invention relates to wireless communication, and more particularly, to a method and apparatus for receiving acknowledgement/not-acknowledgement (ACK/NACK) indicating reception acknowledgement in a wireless communication system.

Related Art

One of the most important requirements of a next generation wireless communication system is to support a high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various techniques are partially used in a wide frequency band. For this reason, as a method of ensuring a broadband bandwidth for satisfying a required higher data rate, a carrier aggregation (CA) is introduced. In concept, the CA is designed such that a basic requirement which allows separate bands to operate respective independent systems, and a plurality of bands are aggregated into one system. In this case, a band that can be independently managed is defined as a component carrier (CC).

The latest communication standard (e.g., 3GPP LTE-A or 802.16m) considers to expand its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. As such, a system supporting carrier aggregation is called a carrier aggregation system.

Meanwhile, a wireless communication system considers a system in which a base station supports a greater number of user equipments in comparison with the legacy system. For example, one base station may have to support the greater number of user equipments when a technique such as machine type communication (MTC), enhanced multi user multi input multi output (MIMO), etc., is applied.

In this case, it may be difficult to transmit control information to a plurality of user equipments when using only a physical downlink control channel (PDCCH) in long term evolution (LTE)) conventionally used to transmit the control information. This is because there may be a problem in that a radio resource of the PDCCH is insufficient or an interference becomes serious. In order to solve such a problem, it is considered to allocate a new control region to a radio resource region in which data is transmitted in the legacy system. Such a new control channel is called an enhanced-PDCCH (E-PDCCH).

Meanwhile, a base station transmits acknowledgement/not-acknowledgement (ACK/NACK) for uplink data received from a user equipment through a physical hybrid-ARQ indicator channel (PHICH). The PHICH is located in a region to which a conventional control channel, i.e., PDCCH, is allocated. The PHICH may also have a radio resource shortage problem or an interference problem when the number of user equipments supported by the base station is increased and a carrier aggregation is supported. Therefore, it is considered to introduce a new channel for ACK/NACK transmission, and such a channel is called an enhanced-PHICH (E-PHICH).

However, even if a wireless communication system supports the E-PDCCH and the E-PHICH, the E-PDCCH and the E-PHICH may not be included in all user equipments, all carriers, and all subframes. That is, the E-PDCCH and the E-PHICH may be selectively used. In addition, when the carrier aggregation is supported, multiple carriers may be allocated to a specific user equipment.

In this case, it is necessary to regulate which carrier and which channel will be used by the user equipment to receive ACK/NACK. That is, in which way the base station will transmit ACK/NACK and how the user equipment will receive the ACK/NACK may become a matter to be discussed.

SUMMARY OF THE INVENTION

The present invention provides a method and apparatus for receiving acknowledgement/not-acknowledgement (ACK/NACK) in a wireless communication system.

According to an aspect of the present invention, a method of receiving acknowledgement/not-acknowledgement (ACK/NACK) of a user equipment to which a plurality of serving cells are allocated in a wireless communication system is provided. The method includes: transmitting uplink data through a physical uplink shared channel (PUSCH); and receiving ACK/NACK for the uplink data through a physical hybrid-ARQ indicator channel (PHICH), wherein a serving cell that receives the ACK/NACK is selected from one or more serving cells to be monitored by the user equipment to detect an uplink grant that schedules the PUSCH.

According to another aspect of the present invention, a method of receiving ACK/NACK of a user equipment to which a plurality of serving cells are allocated in a wireless communication system is provided. The method includes: receiving PHICH cell indicator information indicating a PHICH cell; transmitting uplink data through a PUSCH; and receiving ACK/NACK for the uplink data through a PHICH, wherein the ACK/NACK is received through a serving cell indicated by the PHICH cell indicator information.

According to another aspect of the present invention, a method of receiving ACK/NACK of a user equipment to which a plurality of serving cells are allocated in a wireless communication system is provided. The method includes: transmitting uplink data through a PUSCH; receiving an uplink grant through an enhanced-physical downlink control channel (E-PDCCH); and retransmitting the uplink data or transmitting new uplink data on the basis of the uplink grant, wherein the uplink grant is included in a subframe in which the uplink grant is received, instead of a PHICH which transmits ACK/NACK for the uplink data.

According to another aspect of the present invention, a method of receiving ACK/NACK of a user equipment to which a plurality of serving cells are allocated in a wireless communication system is provided. The method includes: transmitting uplink data through a PUSCH; and receiving ACK/NACK for the uplink data through a PHICH, wherein a serving cell for receiving the ACK/NACK is a serving cell that receives an uplink grant for scheduling the PUCSH, the uplink grant is received through an E-PDCCH, and the E-PDCCH is a control channel which is decoded by using a reference signal that is specific to the user equipment.

According to another aspect of the present invention, there is provided a user equipment including: a radio frequency (RF) unit for transmitting and receiving a radio signal; and a processor operatively coupled to the RF unit, wherein the processor is configured for: transmitting uplink data through a PUSCH; and receiving ACK/NACK for the uplink data through a PHICH, wherein a serving cell that receives the ACK/NACK is selected from one or more serving cells to be monitored by the user equipment to detect an uplink grant that schedules the PUSCH.

According to another aspect of the present invention, there is provided a user equipment including: an RF unit for transmitting and receiving a radio signal; and a processor operatively coupled to the RF unit, wherein the processor is configured for: receiving PHICH cell indicator information indicating a PHICH cell; transmitting uplink data through a PUSCH; and receiving ACK/NACK for the uplink data through a PHICH, wherein the ACK/NACK is received through a serving cell indicated by the PHICH cell indicator information.

According to another aspect of the present invention, there is provided a user equipment including: an RF unit for transmitting and receiving a radio signal; and a processor operatively coupled to the RF unit, wherein the processor is configured for: transmitting uplink data through a PUSCH; receiving an uplink grant through an E-PDCCH; and retransmitting the uplink data or transmitting new uplink data on the basis of the uplink grant, wherein the uplink grant is included in a subframe in which the uplink grant is received, instead of a PHICH which transmits ACK/NACK for the uplink data.

According to another aspect of the present invention, there is provided a user equipment including: an RF unit for transmitting and receiving a radio signal; and a processor operatively coupled to the RF unit, wherein the processor is configured for: transmitting uplink data through a PUSCH; and receiving ACK/NACK for the uplink data through a PHICH, wherein a serving cell for receiving the ACK/NACK is a serving cell that receives an uplink grant for scheduling the PUCSH, the uplink grant is received through an E-PDCCH, and the E-PDCCH is a control channel which is decoded by using a reference signal that is specific to the user equipment.

According to the present invention, a user equipment can receive acknowledgement/not-acknowledgement (ACK/NACK) without an ambiguity in a wireless communication system in which an additional control channel, i.e., an enhanced-physical downlink control channel (E-PDCCH), is configured in addition to the conventional physical downlink control channel (PDCCH).

DESCRIPTION OF EXEMPLARY EMBODIMENTS

Long term evolution (LTE) of the $3^{rd}$ generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiple access (SC-FDMA) in an uplink. LTE-advance (LTE-A) is an evolution of the 3GPP LTE. For clarity, the following description will focus on the 3GPP LTE/LTE-A. However, technical features of the present invention are not limited thereto.

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
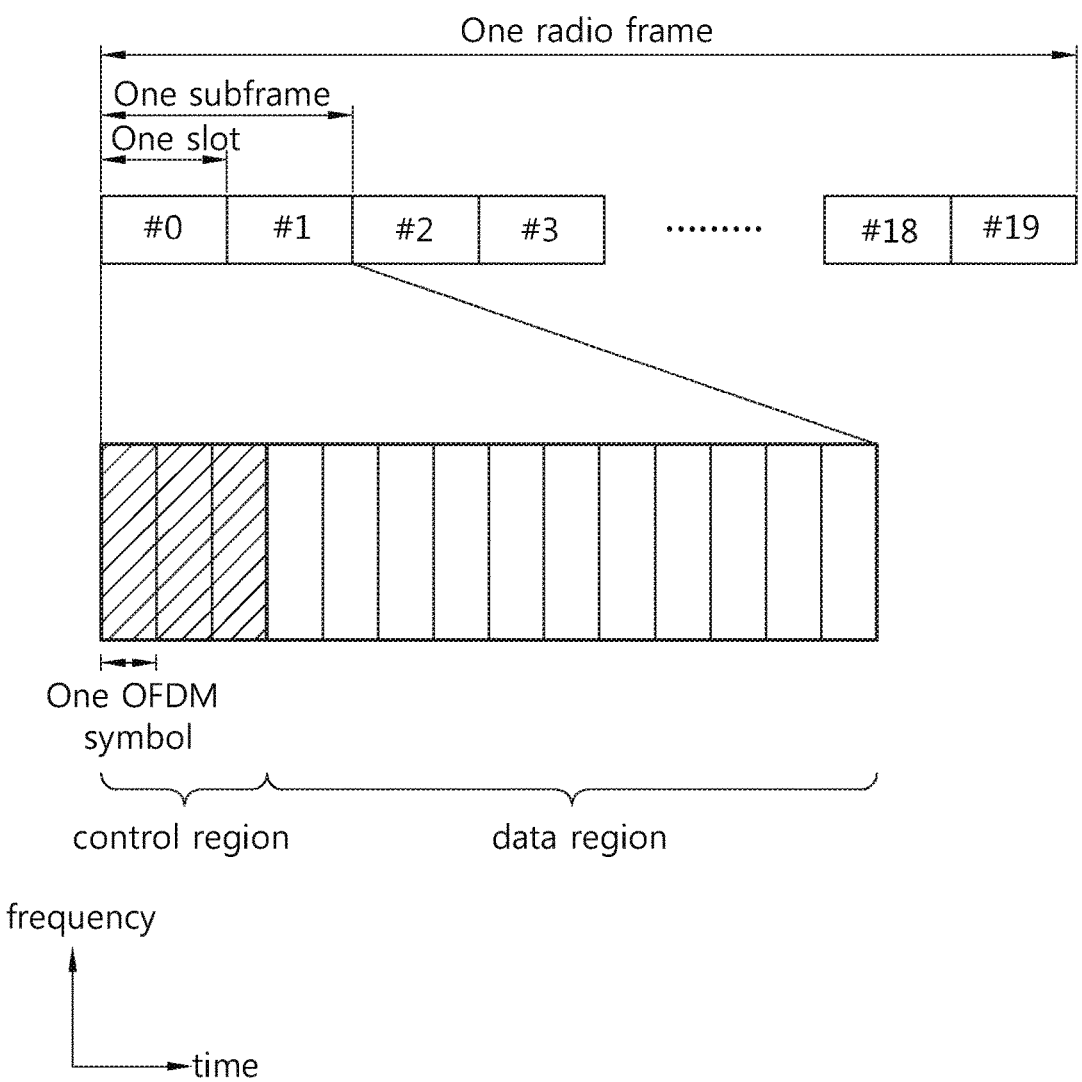
FIG. 1 shows a structure of a downlink radio frame in $3^{rd}$ generation partnership project (3GPP) long term evolution-advanced (LTE-A).

FIG. 1 shows a structure of a downlink radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

Figure 2:
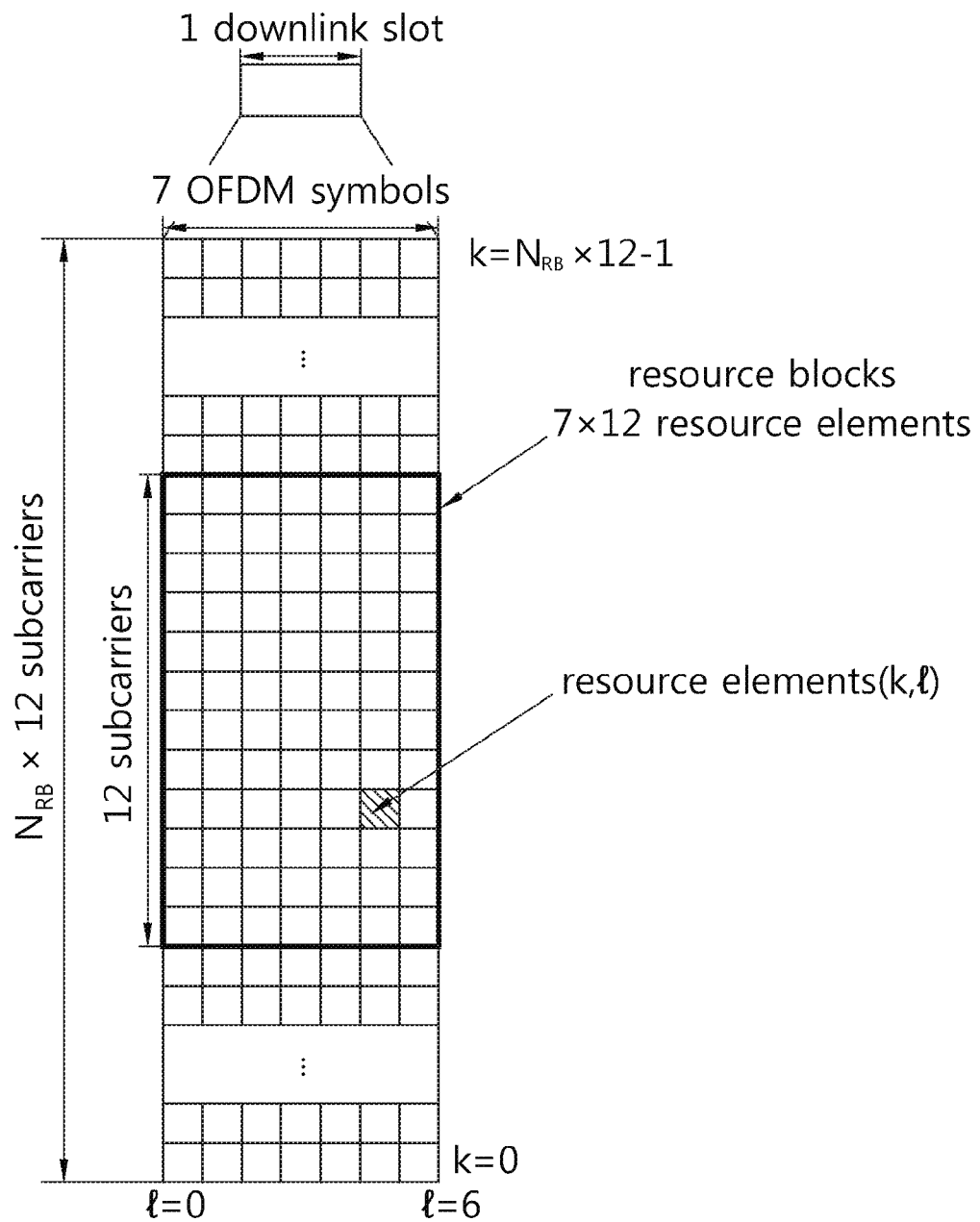
FIG. 2 shows an example of a resource grid for one downlink (DL) slot.

FIG. 2 shows an example of a resource grid for one downlink (DL) slot.

Referring to FIG. 2, the DL slot includes a plurality of OFDM symbols in a time domain, and includes $N_{RB}$ resource blocks (RBs) in a frequency domain. The RB includes one slot in the time domain in a unit of resource allocation, and includes a plurality of consecutive subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described in FIG. 2 that one RB consists of 7 OFDM symbols in the time domain and 12 subcarriers in the frequency domain and thus includes 7×12 REs, this is for exemplary purposes only. Therefore, the number of OFDM symbols and the number of subcarriers in the RB are not limited thereto. The number of OFDM symbols and the number of subcarriers may change variously depending on a CP length, a frequency spacing, etc. The number of subcarriers in one OFDM symbol may be any one value selected from 128, 256, 512, 1024, 1536, and 2048.

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH). The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 3:
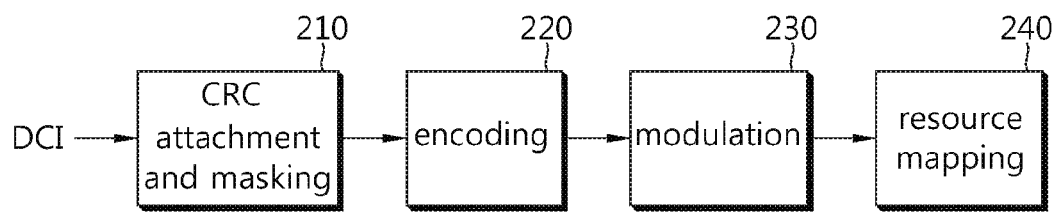
FIG. 3 is a block diagram showing a structure of a physical downlink control channel (PDCCH).

FIG. 3 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set $\{1, 2, 4, 8\}$. Each element of the set $\{1, 2, 4, 8\}$ is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 4:
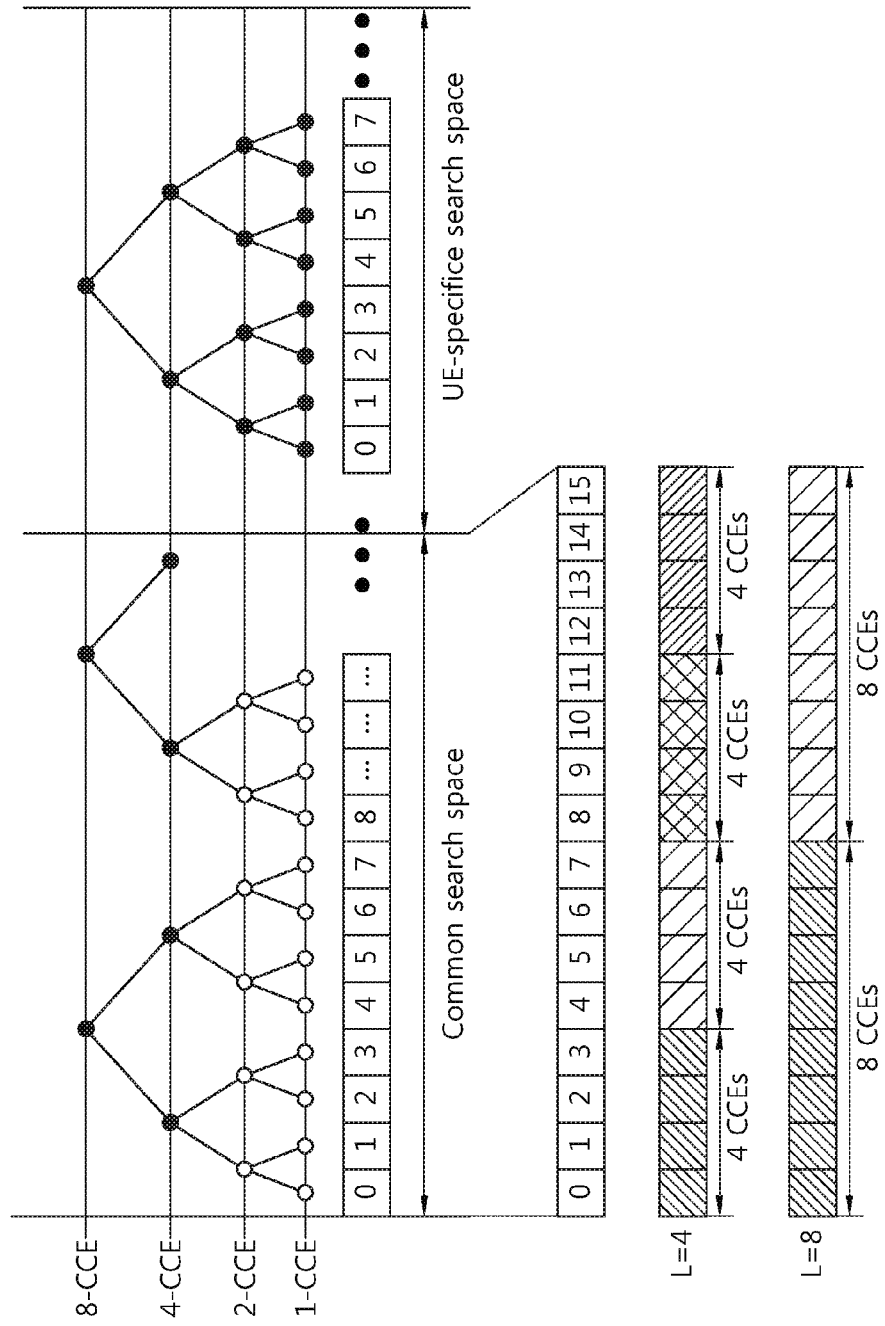
FIG. 4 shows an example of monitoring a PDCCH.

FIG. 4 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of $\{4, 8\}$. However, a PDCCH (e.g., DCI formats 0, 1A) for carrying UE-specific information can also be transmitted in the common search space. The UE-specific search space supports a PDCCH having a CCE aggregation level of $\{1, 2, 4, 8\}$.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level $L \in \{1,2,3,4\}$, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \qquad [\text{Equation 1}]$$

Herein, i=0, 1, ..., L−1, m=0, ..., $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the wireless device, m'=m+$M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \qquad \text{[Equation 2]}$$

Herein, $Y_{-1}=n_{RNTI}\neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single antenna port, port 0 |
|  | DCI format 1 | UE specific | Single antenna port, port 0 |
| Mode 2 | DCI format 1A | common and UE specific | Transmit diversity |
|  | DCI format 1 | UE specific | Transmit diversity |
| Mode 3 | DCI format 1A | common and UE specific | Transmit diversity |
|  | DCI format 2A | UE specific | CDD(Cyclic Delay Diversity) or Transmit diversity |
| Mode 4 | DCI format 1A | common and UE specific | Transmit diversity |
|  | DCI format 2 | UE specific | Closed-loop spatial multiplexing |
| Mode 5 | DCI format 1A | common and UE specific | Transmit diversity |
|  | DCI format 1D | UE specific | MU-MIMO(Multi-user Multiple Input Multiple Output) |
| Mode 6 | DCI format 1A | common and UE specific | Transmit diversity |
|  | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
|  | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
|  | DCI format 2B | UE specific | Dual layer transmission (port 7 or 8), or single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |
| DCO format 4 | It is used for PUSCH scheduling of one UL cell in multiple antenna transmission mode. |

Figure 5:
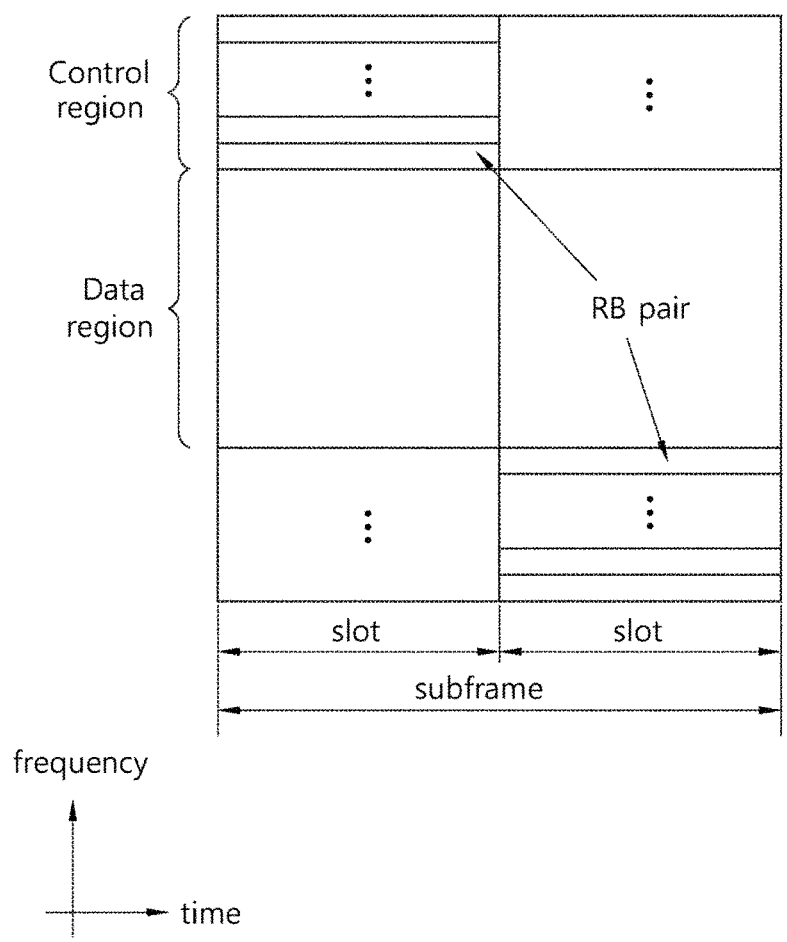
FIG. 5 shows a structure of an uplink (UL) subframe.

FIG. 5 shows a structure of a UL subframe.

Referring to FIG. 5, the UL subframe can be divided into a control region and a data region in a frequency domain. A physical uplink control channel (PUCCH) for transmitting UL control information is allocated to the control region. A physical uplink shared channel (PUSCH) for transmitting data (optionally, control information can be transmitted together) is allocated to the data region. According to a configuration, the UE may simultaneously transmit the PUCCH and the PUSCH, or may transmit any one of the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. By transmitting UL control information over time through different subcarriers, a frequency diversity gain can be obtained.

A hybrid automatic repeat request (HARQ) acknowledgement (ACK)/non-acknowledgment (NACK) and channel status information (CSI) indicating a DL channel status (e.g., channel quality indicator (CQI), a precoding matrix index (PMI), a precoding type indicator (PTI), a rank indication (RI)) can be transmitted on the PUCCH. Periodic CSI can be transmitted through the PUCCH.

The PUSCH is mapped to an uplink shared channel (UL-SCH) which is a transport channel. UL data transmitted through the PUSCH may be a transport block which is a data block for the UL-SCH transmitted during a TTI. The transport block may include user data. Alternatively, the UL data may be multiplexed data. The multiplexed data may be obtained by multiplexing CSI and a transport block for the UL-SCH. Examples of the CSI multiplexed to the data may include a CQI, a PMI, an RI, etc. Alternatively, the UL data may consist of only CSI. Periodic or aperiodic CSI can be transmitted through the PUSCH.

Now, HARQ in 3GPP LTE will be described.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. That is, in the synchronous HARQ, initial transmission and retransmission are performed with an HARQ period.

Figure 6:
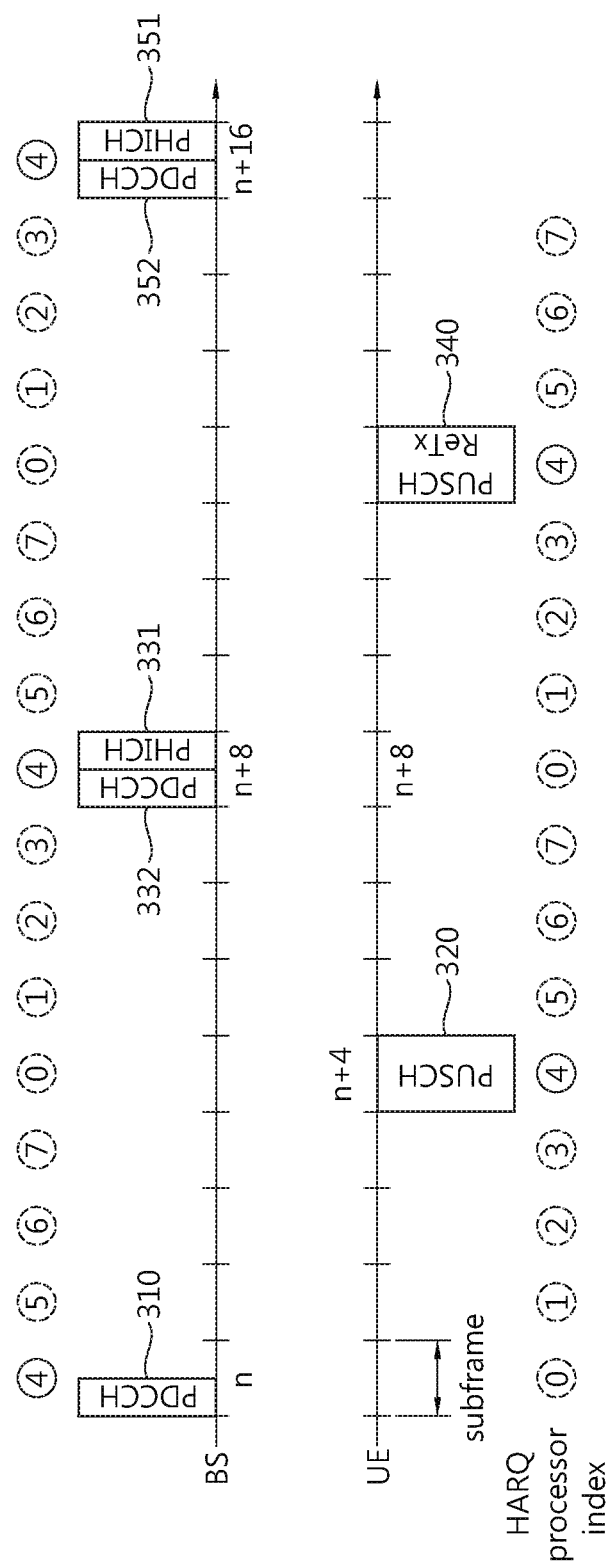
FIG. 6 shows UL synchronous hybrid automatic repeat request (HARQ) in 3GPP LTE.

FIG. 6 shows UL synchronous HARQ in 3GPP LTE.

A wireless device receives an initial UL grant on a PDCCH 310 from a BS in an $n^{th}$ subframe.

The wireless device transmits a UL transport block on a PUSCH 320 by using the initial UL grant in an $(n+4)^{th}$ subframe.

The BS sends an ACK/NACK signal for the UL transport block on a PHICH 331 in an $(n+8)^{th}$ subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL grant on a PDCCH 332, or may not send an additional UL grant. Alternatively, retransmission of previous data may be suspended and a UL grant may be sent for transmission of new data. In case the ACK signal, the BS may send the UL grant for new transmission through the PDCCH. In addition, the BS may send the UL grant for retransmission (or retransmission UL grant). Upon receiving the retransmission UL grant, the wireless device ignores the ACK/NACK signal and follows an instruction of the retransmission UL grant. This is because the UL grant has higher reliability since the ACK/NACK signal does not have CRC and the UL grant has CRC.

When the UL grant is not received and the NACK signal is received, the wireless device sends a retransmission block on a PUSCH 340 in an $(n+12)^{th}$ subframe. For the transmission of the retransmission block, if the retransmission UL grant is received on the PDCCH 332, the wireless device uses the retransmission UL grant, and if the retransmission UL grant is not received, the wireless device uses the initial UL grant.

The BS sends an ACK/NACK signal for the UL transport block on a PHICH 351 in an $(n+16)^{th}$ subframe. When the ACK/NACK signal is the NACK signal, the BS may send a retransmission UL grant on a PDCCH 352, or may not send an additional UL grant.

After initial transmission is performed in the $(n+4)^{th}$ subframe, retransmission is performed in the $(n+12)^{th}$ subframe, and thus synchronous HARQ is performed with an HARQ period corresponding to 8 subframes.

Therefore, in frequency division duplex (FDD) of 3GPP LTE, 8 HARQ processes can be performed, and the respective HARQ processes are indexed from 0 to 7.

Figure 7:
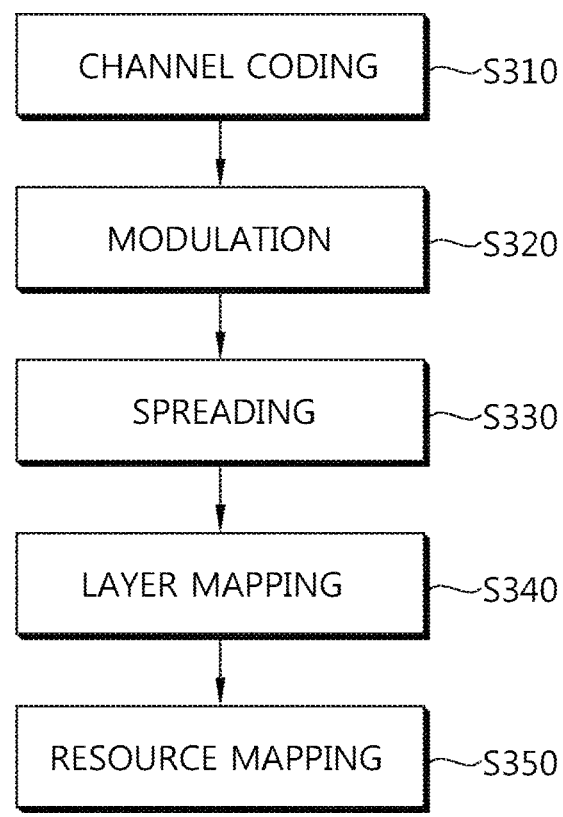
FIG. 7 shows a structure of a physical hybrid-ARQ indicator channel (PHICH) in 3GPP LTE.

FIG. 7 shows a structure of a PHICH in 3GPP LTE.

One PHICH carries only 1-bit ACK/NACK corresponding to a PUSCH for one UE, that is, corresponding to a single stream.

In step S310, the 1-bit ACK/NACK is coded into 3 bits by using a repetition code having a code rate of 1/3.

In step S320, the coded ACK/NACK is modulated using binary phase shift keying (BPSK) to generate 3 modulation symbols.

In step S330, the modulation symbols are spread by using an orthogonal sequence. A spreading factor (SF) is $N^{PHICH}_{SF}=4$ in a normal CP, and is $N^{PHICH}_{SF}=2$ in an extended CP. The number of orthogonal sequences used in the spreading is $N^{PHICH}_{SF}*2$ to apply I/Q multiplexing. PHICHs which are spread by using $N^{PHICH}_{SF}*2$ orthogonal sequences can be defined as one PHICH group.

Table 4 below shows an orthogonal sequence for the PHICH.

TABLE 4

| | orthogonal sequence | |
|---|---|---|
| $n^{seq}_{PHICH}$ | normal CP ($N^{PHICH}_{SF} = 4$) | extended CP ($N^{PHICH}_{SF} = 2$) |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | |
| 5 | [+j −j +j −j] | |
| 6 | [+j +j −j −j] | |
| 7 | [+j −j −j +j] | |

In step S340, layer mapping is performed on the spread symbols.

In step S350, the layer-mapped symbols are transmitted by being mapped to resources.

A plurality of PHICHs mapped to resource elements of the same set constitute a PHICH group. Each PHICH included in the PHICH group is identified by a different orthogonal sequence. In the FDD system, $N^{group}_{PHICH}$, i.e., the number of PHICH groups, is constant in all subframes, and can be determined by Equation 3 below.

$$N_{PHICH}^{group} = \begin{cases} \text{ceil}(N_g(N_{RB}^{DL}/8)) & \text{for normal } CP \\ 2\,\text{ceil}(N_g(N_{RB}^{DL}/8)) & \text{for extended } CP \end{cases} \quad [\text{Equation 3}]$$

Herein, Ng denotes a parameter transmitted through a physical broadcast channel (PBCH), where Ng∈{1/6, 1/2 ,1,2}. $N^{DL}_{RB}$ denotes the number of DL RBs.

ceil(x) is a function for outputting a minimum value among integers equal to or greater than x. floor(x) is a function for outputting a maximum value among integers equal to or less than x.

The wireless device identifies a PHICH resource by using an index pair ($n^{group}_{PHICH}$, $n^{seq}_{PHICH}$) used by the PHICH. A PHICH group index $n^{group}_{PHICH}$ has a value in the range of 0 to $N^{group}_{PHICH}-1$. An orthogonal sequence index $n^{seq}_{PHICH}$ denotes an index of an orthogonal sequence.

An index pair ($n^{group}_{PHICH}$, $n^{seq}_{PHICH}$) is obtained according to Equation 1 below.

$$n_{PHICH}^{group} = (I_{PRB\_RA}^{lowest\_index} + n_{DMRS}) \bmod N_{PHICH}^{group} + I_{PHICH}N_{PHICH}^{group}$$

$$n_{PHICH}^{seq} = (\text{floor}(I_{PRB\_RA}^{lowest\_index}/N_{PHICH}^{group}) + n_{DRMS}) \bmod 2N_{SF}^{PHICH} \quad [\text{Equation 4}]$$

Herein, $n_{DMRS}$ denotes a cyclic shift of a demodulation reference signal (DMRS) within the most recent UL grant for a transport block related to corresponding PUSCH transmission. The DMRS is an RS used for PUSCH transmission. $N^{PHICH}_{SF}$ denotes an SF size of an orthogonal sequence used in PHICH modulation. $I^{lowest\_index}_{PRB\_RA}$ denotes the smallest PRB index in a 1$^{st}$ slot of corresponding PUSCH transmission. $I_{PHICH}$ is 0 or 1.

A physical resource block (PRB) is a unit frequency-time resource for transmitting data. One PRB consists of a plurality of contiguous REs in a frequency-time domain. Hereinafter, the RB and the PRB are used for the same concept.

<Semi-Persistent Scheduling: SPS>

In the wireless communication system, the UE receives scheduling information such as a DL grant, a UL grant, etc., through the PDCCH, and performs an operation of receiving the PDSCH and transmitting the PUSCH on the basis of the scheduling information. In general, the DL grant and the PDSCH are received in the same subframe. In addition, in case of FDD, the PUSCH is transmitted four subframes later than a subframe in which the UL grant is received. In addition to such dynamic scheduling, LTE also provides semi-persistent scheduling (SPS).

In a DL or UL SPS, a higher-layer signal such as radio resource control (RRC) can be used to report a UE about specific subframes in which semi-persistent transmission/reception is performed. Examples of a parameter given by using the higher layer signal may be a subframe period and an offset value.

The UE recognizes semi-persistent transmission through RRC signaling, and thereafter performs or releases SPS PDSCH reception or SPS PUCCH transmission upon receiving an activation or release signal of SPS transmission through a PDCCH. That is, in a case where the activation or release signal is received through the PDCCH instead of directly performing SPS transmission even if SPS scheduling is assigned through RRC signaling, SRS transmission and reception are performed in a subframe corresponding to an offset and a subframe period allocated through RRC signaling by applying a modulation and coding rate based on modulation and coding scheme (MCS) information and a frequency resource (or resource block) based on resource block allocation designated in the PDCCH. If an SPS release signal is received through the PDCCH, SPS transmission/reception is suspended. Upon receiving a PDCCH including the SPS activation signal, the suspended SPS transmission/reception is resumed by using an MCS and a frequency resource designated in the PDCCH.

<Carrier Aggregation>

Now, a carrier aggregation system will be described.

Figure 8:
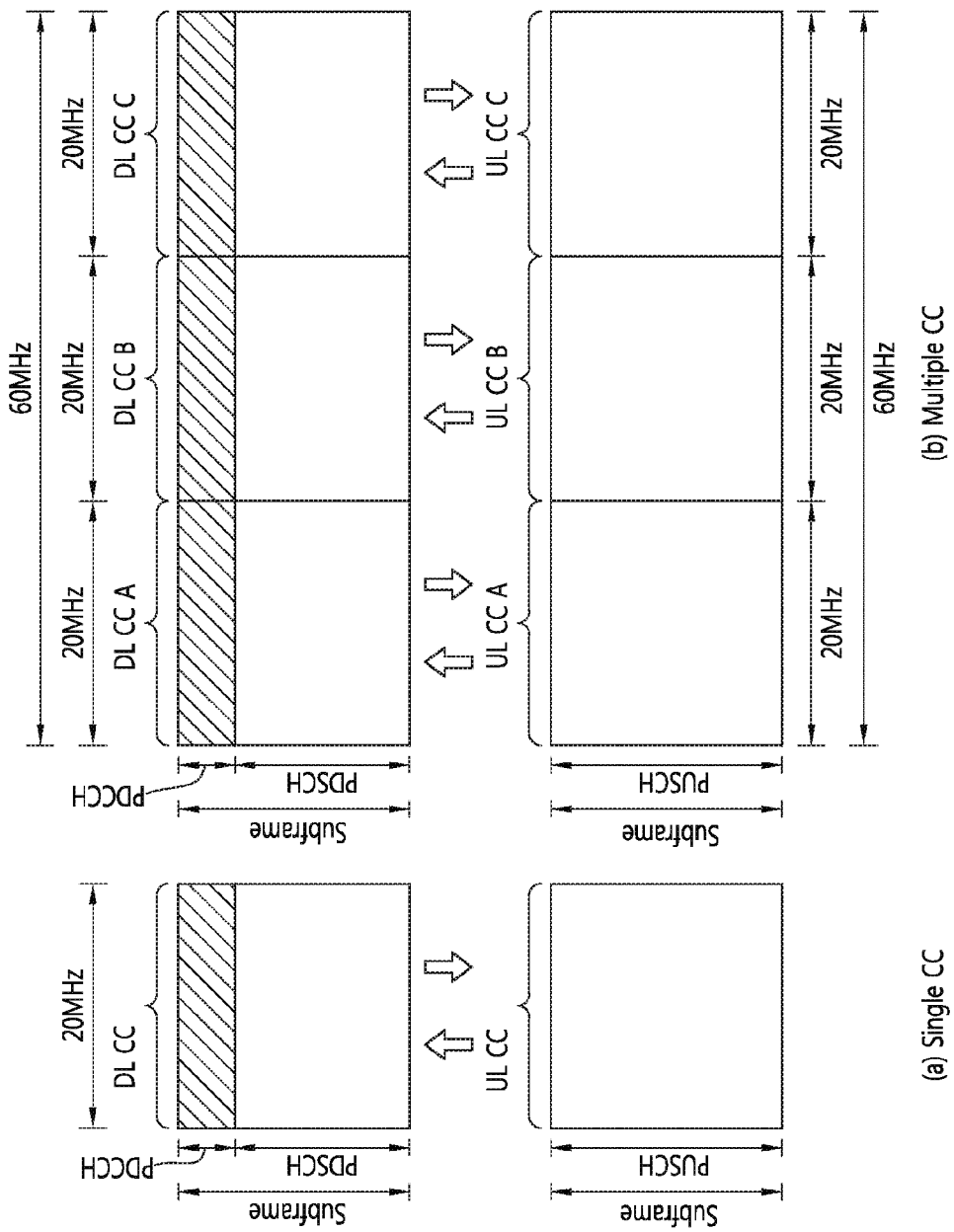
FIG. 8 shows an example of comparing a legacy single-carrier system and a carrier aggregation system.

FIG. 8 shows an example of comparing a legacy single-carrier system and a carrier aggregation system.

Referring to FIG. 8, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. A CC implies a carrier used in a carrier aggregation system, and can be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure.

The secondary cell implies a cell which operates at a secondary frequency, and is configured when an RRC connection is once established and is used to provide an additional radio resource.

The serving cell is configured with the primary cell in case of a UE of which carrier aggregation is not configured or which cannot provide the carrier aggregation. If the carrier aggregation is configured, the term 'serving cell' is used to indicate a cell configured for the UE, and the cell may be plural in number. One serving cell may consist of one DL CC or a pair of {DL CC, UL CC}. A plurality of serving cells may be configured with a set consisting of a primary cell and one or a plurality of cells among all secondary cells.

A primary component carrier (PCC) denotes a CC corresponding to the primary cell. The PCC is a CC that establishes an initial connection (or RRC connection) with a BS among several CCs. The PCC serves for connection (or RRC connection) for signaling related to a plurality of CCs, and is a CC that manages a UE context which is connection information related to the UE. In addition, the PCC establishes a connection with the UE, and thus always exists in an activation state when in an RRC connected mode. A downlink CC corresponding to the primary cell is called a downlink primary component carrier (DL PCC), and an uplink CC corresponding to the primary cell is called an uplink primary component carrier (UL PCC).

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state. A DL CC corresponding to the secondary cell is called a DL secondary CC (SCC). A UL CC corresponding to the secondary cell is called a UL SCC.

The primary cell and the secondary cell have the following features.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can be changed by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection procedure. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0 )+20 MHz CC(carrier #1)+20 MHz CC(carrier #2)+20 MHz CC(carrier #3)+5 MHz CC(carrier #4).

As described above, the carrier aggregation system can support multiple component carriers (CCs), that is, multiple serving cells, unlike a single-carrier system.

The carrier aggregation system can support cross-carrier scheduling. The cross-carrier scheduling is a scheduling method capable of performing resource allocation of a PDSCH transmitted by using a different carrier through a PDCCH transmitted via a specific CC and/or resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

The carrier aggregation system supporting the cross-carrier scheduling may include a CIF in the conventional downlink control information (DCI) format. In a system supporting the cross-carrier scheduling, e.g., an LTE-A system, the CIF is added to the conventional DCI format (i.e., the DCI format used in LTE) and thus the number of bits can be extended by 3 bits, and the PDCCH structure can reuse the conventional coding scheme, resource allocation scheme (i.e., CCE-based resource mapping), etc.

Figure 9:
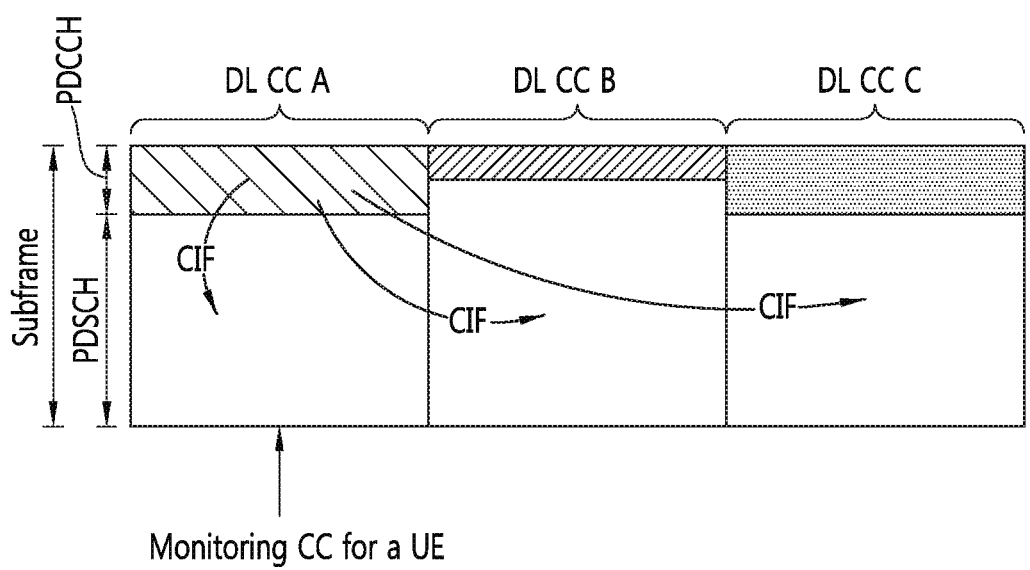
FIG. 9 shows an example of cross-carrier scheduling in a carrier aggregation system.

FIG. 9 shows an example of cross-carrier scheduling in a carrier aggregation system.

Referring to FIG. 9, a BS can configure a PDCCH monitoring DL CC set. The PDCCH monitoring DL CC set consists of some DL CCs among all aggregated DL CCs. When the cross-carrier scheduling is configured, a UE performs PDCCH monitoring/decoding only for a DL CC included in the PDCCH monitoring DL CC set. In other words, the BS transmits a PDCCH for a to-be-scheduled PDSCH/PUSCH only via a DL CC included in the PDCCL monitoring DL CC set. The PDCCH monitoring DL CC set can be determined in a UE-specific, UE group-specific, or cell-specific manner.

In the example of FIG. 9, 3 DL CCs (i.e., DL CC A, DL CC B, DL CC C) are aggregated, and the DL CC A is determined as the PDCCH monitoring DL CC. The UE can receive a DL grant for a PDSCH of the DL CC A, the DL CC B, and the DL CC C through the PDCCH. A CIF may be included in DCI transmitted through the PDCCH of the DL CC A to indicate a specific DL CC for which the DCI is provided.

Figure 10:
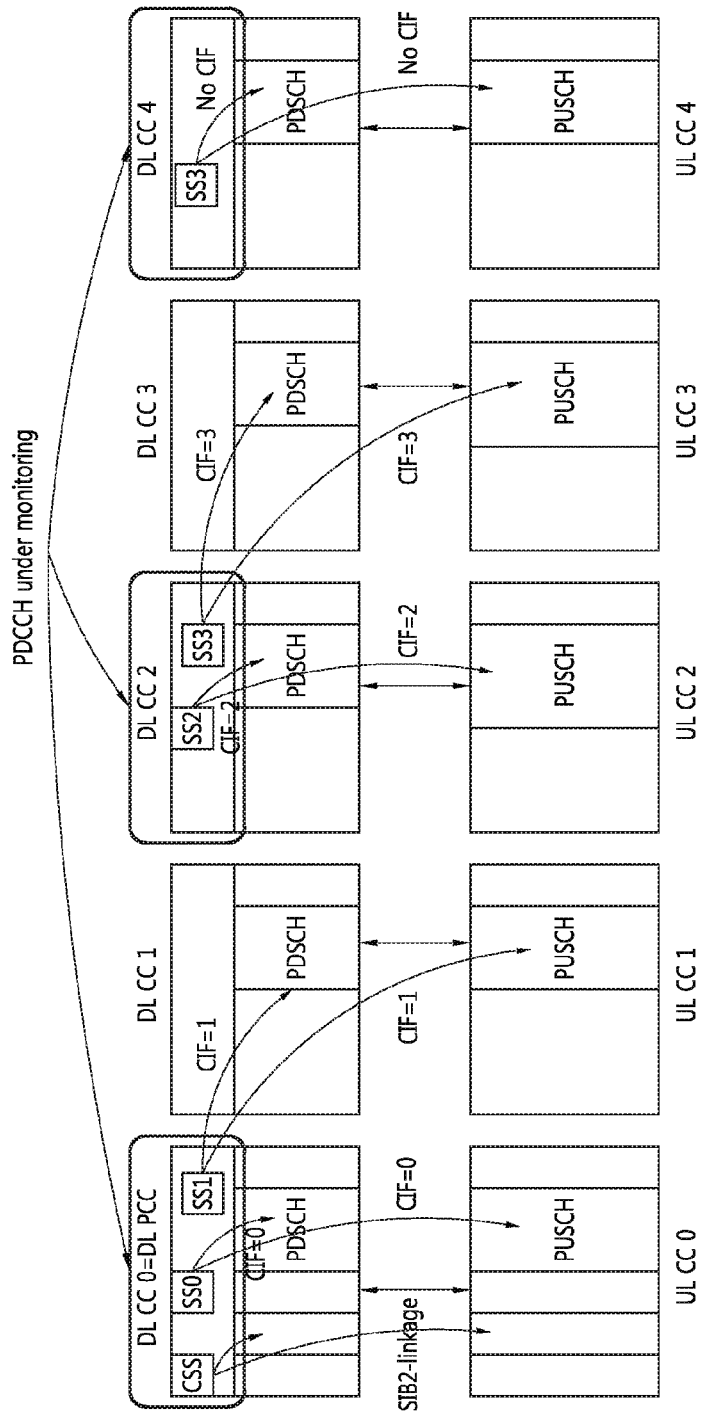
FIG. 10 shows an example of scheduling when cross-carrier scheduling is configured in a carrier aggregation system.

FIG. 10 shows an example of scheduling when cross-carrier scheduling is configured in a carrier aggregation system.

Referring to FIG. 10, a DL CC 0, a DL CC 2, and a DL CC 4 constitute a monitoring DL CC set. A UE searches for a DL grant/UL grant regarding the DL CC 0 and a UL CC 0 (i.e., a UL CC linked to the DL CC 0 by using an SIB2) in a CSS of the DL CC 0. Further, the UE searches for a DL grant/UL grant regarding a DL CC 1 and a UL CC 1 in an SS 1 of the DL CC 0. The SS 1 is an example of a USS. That is, the SS 1 of the DL CC 0 is a search space for searching for the DL grant/UL grant for performing cross-carrier scheduling.

Now, the present invention will be described.

In a system enhanced from LTE release 10, a greater number of UEs can access to one BS in comparison with the legacy system due to a technique such as machine type communication (MTC), enhanced multi user-multi input multi output (MU-MIMO), etc. In this case, it may be difficult to deliver control information to a plurality of UEs by using only the existing control region, i.e., a PDCCH region, in a DL subframe. That is, the control region may be insufficient. In addition, a plurality of RRHs or the like are deployed in a cell, which may cause a problem of an interference in the control region.

The LTE-A system considers to introduce a new control channel to solve a resource shortage problem of a PDCCH which is a channel for transmitting control information and a reception performance deterioration problem of a PDCCH region caused by an interference. For convenience of explanation, the new control channel is called an enhanced-PDCCH (E-PDCCH).

The conventional PDCCH differs from the E-PDCCH as follows.

1) The conventional PDCCH may be located in a control region in a subframe, that is, a region consisting of first N OFDM symbols (where N is any natural number in the range of 1 to 4), whereas the E-PDCCH may be located in a data region in the subframe, that is, a region consisting of the remaining OFDM symbols other than the N OFDM symbols.

2) The conventional PDCCH can be decoded on the basis of a cell-specific reference signal, i.e., CRS, that can be received by all UEs in a cell, whereas the E-PDCCH can be decoded on the basis of not only the CRS but also a DM-RS which is specific to a particular UE. Therefore, similarly to the PDSCH, beamforming can be applied to the E-PDSCH by using precoding, and as a result, a reception SINR may be increased.

3) The conventional PDCCH may be applied to a UE which operates in LTE, whereas the E-PDCCH may be selectively applied to a UE supporting LTE-A. Of course, the UE supporting the LTE-A may also support the conventional PDCCH.

In terms of resources constituting the E-PDDCH, there may be a distributed E-PDCCH consisting of distributed resources and a localized E-PDCCH consisting of localized resources. The distributed E-PDCCH can acquire a diversity gain and can be used to transmit control information for several UEs. The distributed E-PDCCH has a frequency selective property and can be used to transmit control information for a particular UE.

Meanwhile, in the LTE-A, a greater amount of ACK/NACK may be transmitted and an interference may become severe in comparison with the legacy system such as a multi-node system in which multiple nodes are included in a cell, a carrier aggregation system supporting multiple carriers, etc. Therefore, a PHICH may also have a resource shortage problem and a reception performance deterioration problem caused by an interference. To solve these problems, the LTE-A considers to introduce a new PHICH in addition to the conventional PHICH. For convenience of explanation, the new PHICH is called an enhanced-PHICH (E-PHICH). The PHICH and the E-PHICH are channels on which a BS transmits ACK/NACK for a UL data channel transmitted by a UE. Unlike a case where the PHICH is configured in the PDCCH region, the E-PHICH may be configured in the PDSCH region. For example, the E-PHCIH may be configured in the E-PDCCH region configured in the PDSCH region.

Figure 11:
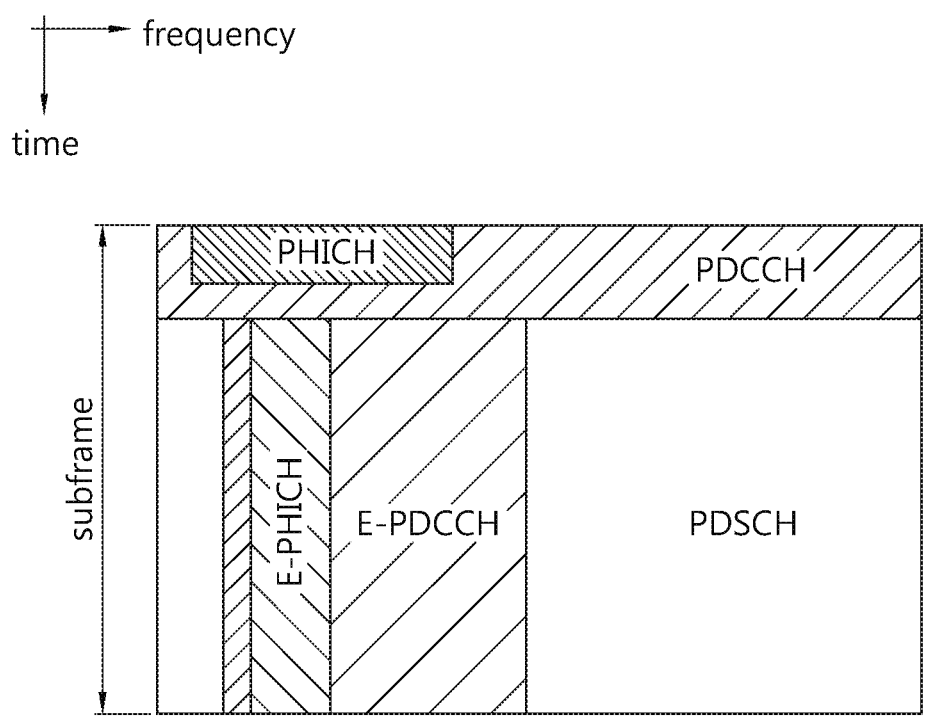
FIG. 11 shows an example of configuring an enhanced-PHICH (E-PHICH) region and an enhanced-PDCCH (E-PDCCH) region.

FIG. 11 shows an example of configuring an E-PHICH region and an E-PDCCH region.

Referring to FIG. 11, the E-PDCCH region may be configured in a PDSCH region.

Similarly to the PDCCH region, the E-PDCCH region may include an enhanced-common search space (E-CSS) in which all UEs or a specific UE group in a cell search for an E-PDCCH thereof and an enhanced-UE-specific search space (E-USS) in which only a specific UE searches for an E-PDCCH thereof. Alternatively, any one of the E-CSS and the E-USS may be included.

Meanwhile, the E-PHICH may be configured in the E-PDCCH region. For example, the E-PHICH may be configured in the E-CSS. In this case, the E-PHICH may be used to transmit ACK/NACK for a plurality of UEs through multiplexing.

<Configuration of Start OFDM Symbol of E-PHICH>

Similarly to the E-PDCCH, if the E-PHICH is configured in the PDSCH region and is configured from a first slot of a subframe, a position of starting an OFDM symbol of the E-PHICH must be determined by considering the number of all OFDM symbols in which the PDCCH can be located.

For example, the start OFDM symbol position of the E-PHICH may be set equal to a start position of: 1) an E-PDCCH of the same cell or the same subframe; or 2) an E-PDCCH of a subframe in which a UL grant is transmitted for scheduling a PUSCH which is a target of ACK/NACK transmitted on the E-PHICH. This is because the E-PDCCH and the E-PHICH have a similar property in that they are transmitted in a region other than the conventional PDCCH region, and this is to decrease an additional signaling or procedure for the start position of the E-PHICH.

If an E-PDCCH including a CSS and an E-PDCCH including a USS are each present in a specific cell and if start positions of the two can be set differently, the start position of the E-PHICH may be set equal to the start position of the E-PDCCH including the CSS.

In the presence of the distributed E-PDCCH and the localized E-PDCCH, the start position of the E-PHICH may be set identical to the distributed E-PDCCH.

If the configuration of the E-PHICH region is applied commonly to a plurality of UEs, the start position of the E-PHICH may be an OFDM symbol next to a maximum OFDM symbol in which the PDCCH can be located. For example, if the PDCCH can be located in up to 3 OFDM symbols as to a specific band, the start position of the E-PHICH may be a $4^{th}$ OFDM symbol.

Alternatively, the start position of the E-PHICH may be configured by using an RRC message.

In several methods described above, the E-PHICH is characterized in terms of a common channel since ACK/NACK information for a plurality of UEs is multiplexed. In this case, it is considered an aspect in which a transmission method capable of obtaining a diversity gain that can be obtained for an unspecific UE is advantageous over a case of obtaining a frequency selective gain for a specific UE. A more conservative and reliable method for this is to determine a start position of the E-PHICH by considering a maximum range of the PDCCH. The RRC message is configured to provide flexibility of resource utilization to the BS.

Alternatively, the E-PHICH may be transmitted on a search space for an E-PDCCH for scheduling a PUSCH or may be allocated to a specific position (e.g., a pre-fixed position or a position signaled by the RRC message) of the search space.

For example, when a search space of a DL grant and a search space of a UL grant are configured independently, the E-PHICH may be located in the search space of the UL grant. An ACK/NACK response of the BS for the PUSCH may cause retransmission of a PUSCH without a UL grant from a perspective of the UE, and thus may be used instead of the UL grant. Therefore, the E-PHICH may be preferably located in the search space of the UL grant. In addition, this method is also advantageous in terms of load balancing of the E-PDCCH for the UL grant and the DL grant.

Figure 12:
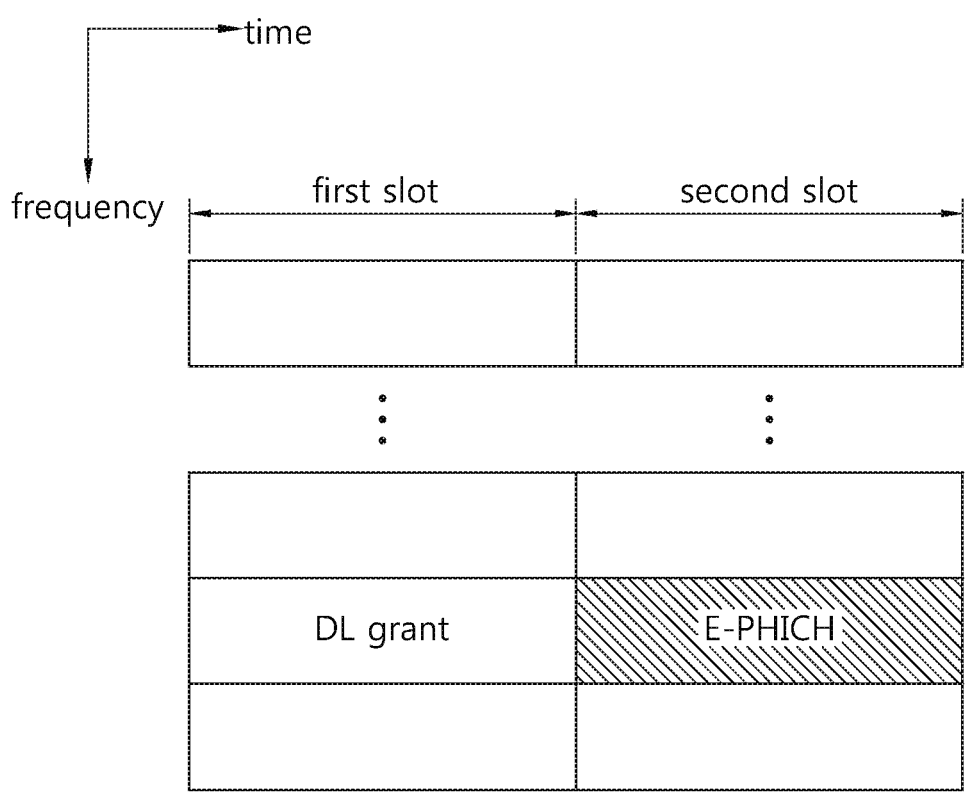
FIG. 12 shows an example of allocating an E-PHICH in a search space.

FIG. 12 shows an example of allocating an E-PHICH in a search space.

Referring to FIG. 12, a search space of a DL grant and a search space of a UL grant may be subjected to time division multiplexing (TDM). For example, the search space of the DL grant may be located in a first slot, and the search space of the UL grant may be located in a second slot. In this case, the E-PHICH is also preferably located in the second slot.

The search space of the DL grant and the search space of the UL grant are subjected to the TDM in that order because an HARQ process based on the UL grant is more tolerant of a time delay since PDSCH decoding based on the DL grant occurs in the same subframe whereas the HARQ process based on the UL grant occurs after a specific number of subframes. Therefore, the E-PHICH is also preferably allowed to maintain the same HARQ timing as the UL grant.

Meanwhile, similarly to a PDCCH-PHICH relation, the E-PHICH may be configured with a channel independent of the E-PDCCH.

Alternatively, instead of configuring the E-PHICH as an independent channel, transmission may be performed in a DCI format of the E-PDCCH. That is, instead of transmitting ACK/NACK for a PUSCH through an additional control channel, i.e., E-PHICH, it may be transmitted by being included in the DCI format of the e-PDCCH or may be transmitted by defining a new DCI format. In this case, the DCI format (or new DCI format) may include multiplexing information of ACK/NACK for a plurality of UEs, and the BS may transmit it by scrambling CRC of the DCI format by the use of an E-PHICH identifier (also called as an E-PHICH RNTI) allocated to a specific UE group. If ACK/NACK for the plurality of UEs is multiplexed to configure a bit-stream, each UE may receive ACK/NACK information through a bit field of a pre-signaled position. Alternatively, as to only a specific UE for transmitting a PUSCH which is a target of ACK/NACK, it may be transmitted by scrambling CRC with a C-RNTI allocated to the specific UE according to a compact DCI format including the ACK/NACK without scheduling information (TPC may be included) such as resource allocation information (including frequency hopping) or a new data indicator (NDI), a modulation and coding scheme (MCS), a DMRS, etc.

<Selection of PHICH or E-PHICH and Selection of Cell for ACK/NACK for PUSCH>

Even if both of the PHICH and the E-PHICH are supported in a wireless communication system, only one of the PHICH and the E-PHICH may be configured for each cell or for each subframe, or both of them may be configured.

If the PHICH and the E-PHICH can be configured in the subframe, the UE may monitor both of the PHICH and the E-PHICH to receive ACK/NACK for a PUSCH, which may be ineffective and may increase power consumption of the UE.

Hereinafter, for convenience of explanation, from a perspective of the UE, a cell for monitoring the PDCCH is called a PDCCH cell, a cell for monitoring the E-PDCCH is called an E-PDCCH cell, a cell for transmitting the PHICH is called a PHICH cell, and a cell for transmitting the E-PHICH is called an E-PHICH cell.

The PDCCH cell may be a cell in which a search space is configured in the PDCCH region, and the E-PDCCH cell may be a cell in which the search space is configured in the E-PDCCH region. The PDCCH cell and the E-PDCCH cell may be mutually exclusive or may overlap with each other. The PHICH cell and the E-PHICH cell also may be mutually exclusive or may overlap with each other. That is, in one cell, the UE may be configured to monitor the PHICH in some subframes, and the UE may be configured to monitor the E-PHICH in other subframes. That is, an operation described below may differ for each subframe.

Now, a case where monitoring of an E-PHICH is not configured and a case where monitoring of the E-PHICH is configured are described below distinctively.

I. When it is configured that a UE does not monitor an E-PHICH.

1. First embodiment: In a case where a UL grant exists in a PDCCH.

1) A corresponding PDCCH cell is a PHICH cell. That is, a PHICH is transmitted together in a cell in which the PDCCH is transmitted. Alternatively, 2) the PHICH cell may be designated with RRC. That is, a BS may configure a cell in which the PHICH is transmitted to a UE through an RRC message. In this case, the PHICH cell and the PDCCH cell may be configured independently. This may be preferable for a consistence with a method of designating a PHICH transmission cell by using RRC as to an E-PDCCH cell to be described below.

2. Second embodiment: In a case where a UL grant exists in an E-PDCCH.

1) Embodiment 2-1: When a plurality of cells are configured to a UE, a PDCCH cell among the plurality of cells may be a PHICH cell. If the PDCCH cell is plural in number, the PHICH cell may be a primary cell.

Since a cell having a relatively good channel state is selected as the PDCCH cell, the PHICH cell is selected from PDCCH cells so that the UE can reliably receive the PHICH. In particular, since the primary cell performs decoding of a PDCCH region in system information reception and initial access, a cell which is examined for PDCCH reception is selected.

2) Embodiment 2-2: A PHICH cell may be a cell in which a UL grant is transmitted through an E-PDCCH. That is, a BS may transmit a PHICH through a cell in which the UL grant is transmitted. This will be described with reference to FIG. 13. The method of FIG. 13 transmits ACK/NACK through the PHICH if an interference of a PDCCH region in which a PHICH is transmitted is not significant in a cell in which the E-PDCCH is transmitted. PHICHs in neighboring cells may be shifted in a frequency axis on the basis of a cell ID, and due to such a characteristic, the a PHICH in a specific cell in which a UL grant is transmitted on the E-PDCCH utilizes a PHICH resource if an interference from the neighboring cell is not significant. According to this method, an operation irrespective of a reconfiguration of RRC signaling may be performed.

Figure 13:
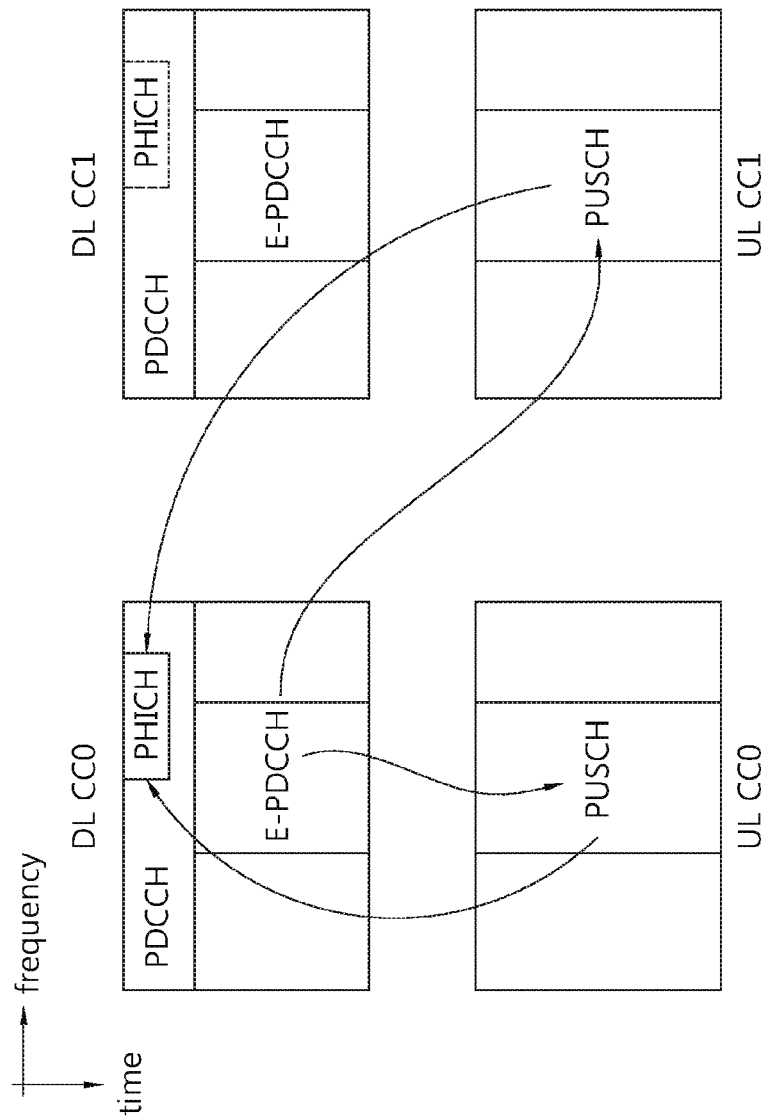
FIG. 13 shows a method of receiving acknowledgement/not-acknowledgement (ACK/NACK) according to the embodiment 2-2.

FIG. 13 shows a method of receiving ACK/NACK according to the embodiment 2-2.

Referring to FIG. 13, DL CCs 0 and 1 and UL CCs 0 and 1 may be configured to a UE. The DL CC 0 and the UL CC 0 configure a first serving cell, and the DL CC 1 and the UL CC 1 configure a second serving cell. The DL CCs 0 and 1 and the UL CCs 0 and 1 are only for indexing of respective CCs for convenience of explanation (the same is also applied to the figures below). The UE may receive UL grants for the UL CCs 0 and 1 through an E-PDCCH of the DL CC 0. The UE transmits a PUSCH through the UL CCs 0 and 1 according to the UL grants. ACK/NACK for the PUSCH is received through a PHICH of the DL CC 0. In FIG. 13, the UL grants and the PHICH are indicated in the same subframe for convenience of explanation only, and thus they are not necessarily transmitted simultaneously in the same subframe.

3) Embodiment 2-3: A PHICH cell for a PUSCH may be pre-designated with RRC. This will be described with reference to FIG. 14.

Figure 14:
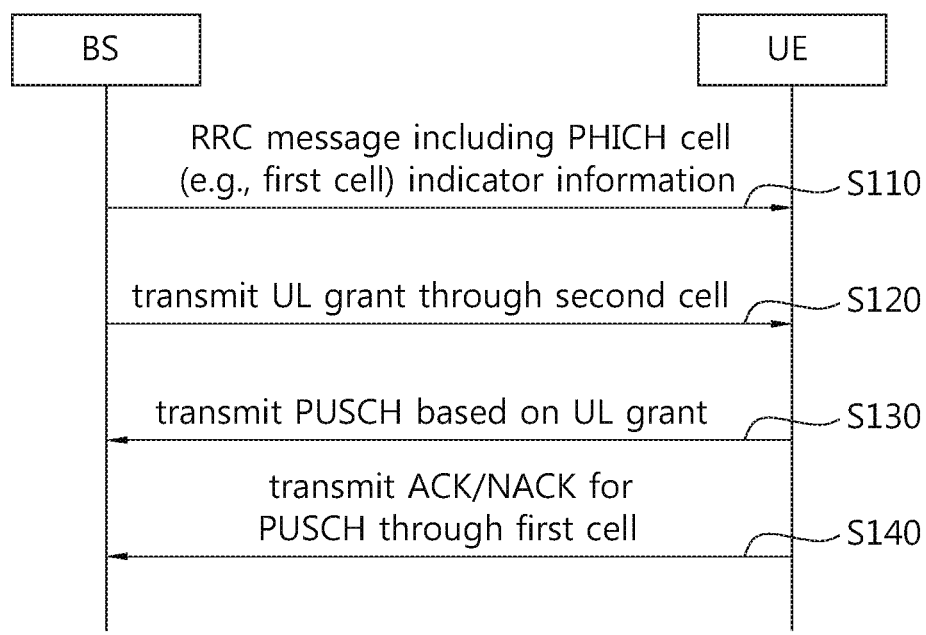
FIG. 14 shows an example of a method of configuring a PHICH cell and receiving ACK/NACK.

FIG. 14 shows an example of a method of configuring a PHICH cell and receiving ACK/NACK.

Referring to FIG. 14, a BS transmits to a UE an RRC message including PHICH cell indicator information indicating a PHICH cell (step S110). The RRC message may be an 'RRCConnectionReconfiguration message'. It is assumed that the PHICH cell indicated by the PHICH cell indicator information is a first cell.

The BS transmits a UL grant through a second cell (step S120). The UL grant may be transmitted through a PDCCH, and may be transmitted through an E-PDCCH.

The UE transmits a PUSCH on the basis of the UL grant (step S130).

The BS transmits ACK/NACK for the PUSCH through the first cell (step S140). Since the PHICH cell (i.e., first cell) can be known by using the PHICH cell indicator information included in the RRC message, the UE can receive ACK/NACK for the PUSCH through the first cell.

That is, the method described with reference to FIG. 14 differs from the method of FIG. 13 in that the PHICH cell is explicitly indicated. In addition, there is no restriction in that the PHICH cell must be configured identically to the E-PDCCH cell in which the UL grant is transmitted.

A configuration based on the RRC may be indicated for each cell. In addition, it may be configured differently for each subframe in one cell so that an inter-cell interference situation for each subframe is more effectively applied than other situations.

4) Embodiment 2-4: Unlike methods of transmitting ACK/NACK through the PHICH, the PHICH for the PUSCH may not be transmitted. In this case, retransmission of HARQ may be performed only by a UL grant. Conventionally, if a UL grant does not exist when NACK is received through the PHICH, the UE retransmits a PUSCH by using a resource based on a previous UL grant. However, the present invention may not allow HARQ retransmission based on NACK and may allow HARQ retransmission based on only the UL grant.

The UE may determine whether to transmit a new PUSCH or retransmit a PUSCH on the basis of a new data indicator (NDI) included in the UL grant. That is, if the NDI of the UL grant indicates new PUSCH transmission, it may be assumed that the UE receives ACK for a previously transmitted PUSCH. A BS may use an RRC message to predetermine whether to operate without a PHICH or to transmit the PHICH.

The PDCCH and the PHICH may not exist in a new carrier type (NCT). In this case, the aforementioned embodiments 2-1, 2-3, and 2-4 may be applied. In addition, the embodiment 2-2 may be applied in the existing legacy carrier type (LCT). The aforementioned embodiments 2-1, 2-3, and 2-4 may be more appropriate to an NCT in which a PHICH cannot be configured since CRS is not configured. For example, when the E-PDCCH is transmitted in the NCT, since the PHICH cannot be configured in the NCT, the method of the embodiment 2-2 cannot be used, and the method of the embodiments 2-1, 2-3, and 2-4 is required.

In case of the embodiments 2-2 and 2-3, if a corresponding cell is not a primary cell, the PHICH may be configured by using a cell ID signaled by RRC, the number of reference signal antenna ports, Ng, and a PHICH duration.

The embodiment 2-2 may be configured when an E-PDCCH cell in which a UL grant is transmitted is a PDCCH cell. That is, the cell corresponds to a cell which monitors a PDCCH in some subframes and monitors an E-PDCCH in other subframes. This is because there is a case where such a cell uses the E-PDCCH for the purpose of compensating for a capacity shortage of the PDCCH since an interference of the PDCCH is not significant.

In addition, a method may be used in which a PHICH is used in case of a UL HARQ process scheduled with a PDCCH and in which the PHICH is not present in case of a UL HARQ process scheduled with an E-PDCCH, that is, the embodiment 2-4 may be used. Alternatively, the embodiment 2-2 may be used when a subframe in which a retransmission UL grant will be received is a subframe in which monitoring of a USS of a PDCCH is configured, and the embodiment 2-1, 2-3, or 2-4 may be applied when it is a subframe in which monitoring of a USS of an E-PDCCH is configured and in which the subframe does not have the E-PHICH. Alternatively, the embodiment 2-2 may be used when a subframe in which an ACK/NACK response for a PUSCH will be received is a subframe in which monitoring of a USS of a PDCCH is configured, and the embodiment 2-1, 2-3, or 2-4 may be applied when it is a subframe in which monitoring of a USS of an E-PDCCH is configured and in which the subframe does not have the E-PHICH. It is considered herein a case where PUSCH subframe bundling is applied or a case where UL grant timing differs from PHICH timing occurs when different TDD UL-DL configurations are used.

II. Third embodiment: When it is configured that a UE monitors an E-PHICH.

When an E-PHICH is configured through a higher layer signal, a PHICH and the E-PHICH may co-exist in the same subframe. Therefore, a BS may report a UE about which channel is used between the PHICH and the E-PHICH to transmit ACK/NACK. The PHICH and the E-PHICH are selectively used according to respective properties. The PHICH is located in a PDCCH region, and thus it may be difficult to avoid performance deterioration when an interference caused by a PDCCH region of a neighboring cell is significant. When the E-PHICH is configured, there is a disadvantage in that an additional PDSCH resource is consumed. However, since the E-PHICH can be configured in a PDSCH region, there is an advantage in that an inter-cell interference can be avoided by regulating inter-cell PDSCH scheduling.

1) Embodiment 3-1: The BS may report about which channel is used between the PHICH and the E-PHICH to transmit ACK/NACK for the PUSCH by using an RRC message for each subframe. A PHICH monitoring configuration and an E-PHICH monitoring configuration may be performed in the same subframe as a PDCCH monitoring configuration and an E-PDCCH monitoring configuration, respectively.

2) Embodiment 3-2: Alternatively, the selection of the PHICH and the E-PHICH may be determined according to a DCI format used for a UL grant. For example, the PHICH may be used for a PUSCH scheduled with a DCI format 0, and the E-PHICH may be used for a PUSCH scheduled with a DCI format 4. The UE may implicitly know which channel is used between the PHICH and the E-PHICH to receive ACK/NACK on the basis of the DCI format included in the UL grant.

3) Embodiment 3-3: The selection of the PHICH and the E-PHICH may be indicated by using a bit field combination of the UL grant. For example, a specific state of a DMRS field may be allowed to instruct the use of the E-PHICH.

4) Embodiment 3-4: When a UL grant for a corresponding HARQ process is transmitted, the E-PHICH may not be transmitted. Therefore, when the UL grant is detected, even if there is a resource allocated with the E-PHICH, the UE may ignore the resource and may utilize it as a PDSCH.

Fourth Embodiment: Designation of a PHICH cell/subframe or an E-PHICH cell/subframe.

Embodiment 4-1: If a UL grant exists in a PDCCH, a PDCCH cell (or subframe) may be a PHICH cell (or subframe), and if the UL grant exists in an E-PDCCH, an E-PDCCH cell (or subframe) may be an E-PHICH cell (or subframe). This will be described with reference to FIG. 15.

Figure 15:
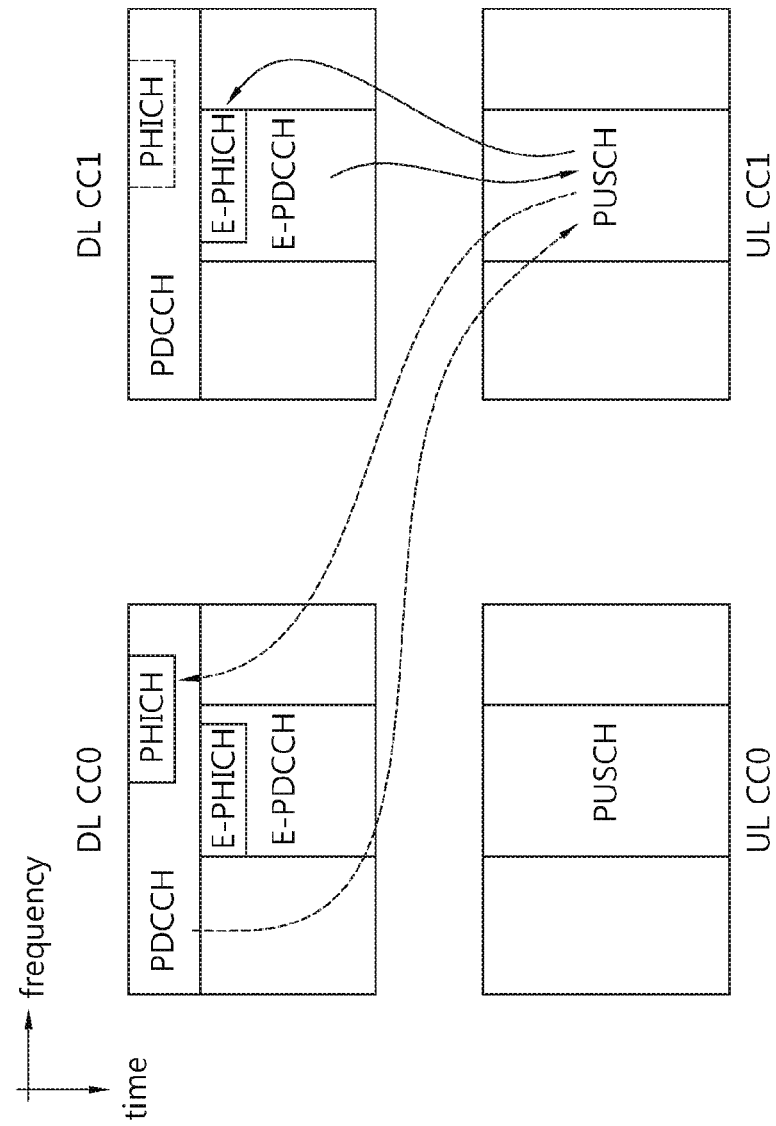
FIG. 15 shows an example of a method of receiving ACK/NACK of a user equipment (UE).

FIG. 15 shows an example of a method of receiving ACK/NACK of a UE.

Referring to FIG. 15, DL CCs 0 and 1 and UL CCs 0 and 1 may be configured to the UE. The UE may receive a UL grant for the UL CC 0 through a PDCCH of the DL CC 0. In addition, a UL grant for the UL CC 1 may be received through an E-PDCCH of the DL CC 1. In this case, according to the embodiment 4-1, the UE can implicitly know that ACK/NACK for a PUSCH transmitted through a UL CC 1 scheduled with the PDCCH must be transmitted through the PHICH and that ACK/NACK for a PUSCH transmitted through a UL CC 1 scheduled with the E-PDCCH must be received through the E-PHICH. In FIG. 15, the UL grants, the PHICH, and the E-PHICH are indicated in the same subframe for convenience of explanation only, and thus they are not necessarily transmitted simultaneously in the same subframe.

Embodiment 4-2: A BS may configure a UE to designate a PHICH monitoring cell and an E-PHICH monitoring cell by using an RRC message for each cell in which a PUSCH is transmitted. That is, the BS may report about which channel is used between the PHICH and the E-PHICH to transmit ACK/NACK for the PUSCH by using an RRC message for each subframe in which the PUSCH is transmitted. Alternatively, which channel is used between the PHICH and the E-PHICH to transmit ACK/NACK for the PUSCH may be configured by using an RRC message for each subframe. That is, the UE monitors a corresponding channel according to a configured state.

Figure 16:
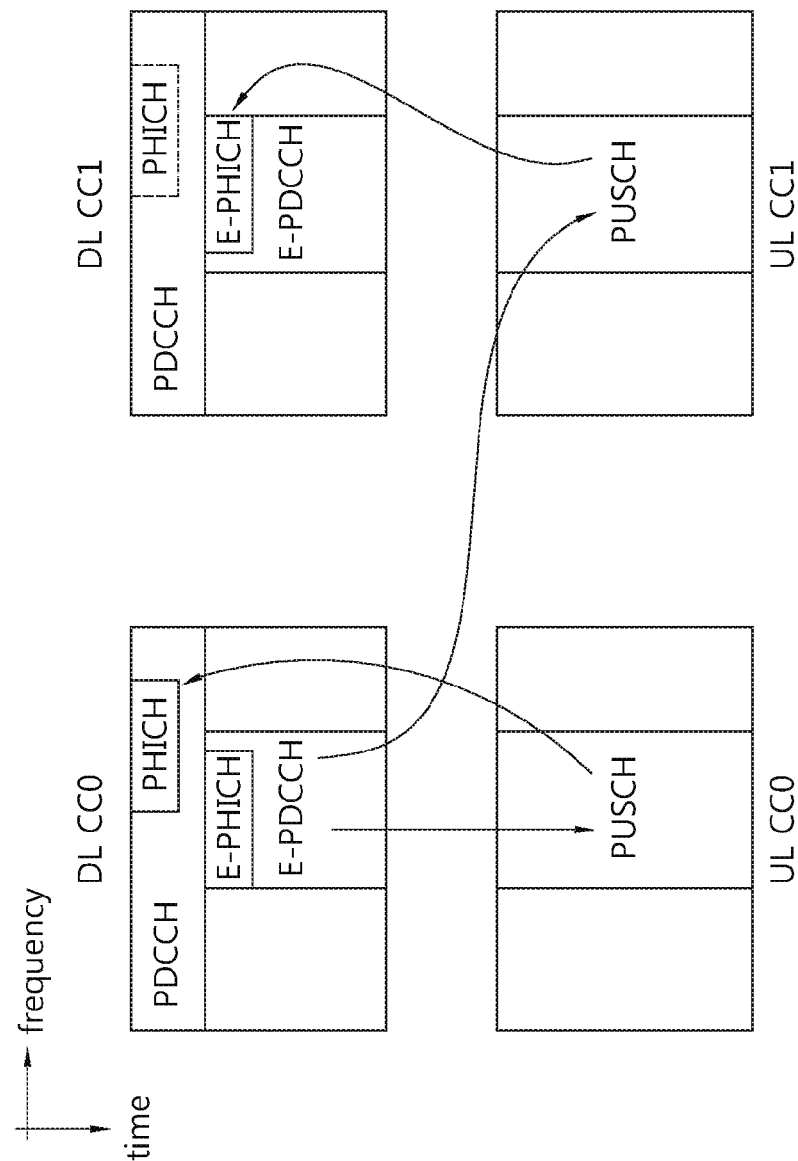
FIG. 16 shows a method of receiving ACK/NACK of a UE according to the embodiment 4-2.

FIG. 16 shows a method of receiving ACK/NACK of a UE according to the embodiment 4-2.

Referring to FIG. 16, DL CCs 0 and 1 and UL CCs 0 and 1 may be configured to the UE. A PHICH cell and E-PHICH cell for receiving ACK/NACK may be indicated to the UE respectively for the UL CCs 0 and 1 through an RRC message. For example, the RRC message may be used to receive information indicating that ACK/NACK must be received through a PHICH of the DL CC 0 as to the UL CC 0 and that ACK/NACK must be received through an E-PHICH of the DL CC 1 as to the UL CC 1.

The UE receives UL grants for the UL CCs 0 and 1 through the E-PDCCH of the DL CC 0, and transmits a PUSCH in the UL CCs 0 and 1 according to the UL grants. In addition, ACK/NACK for the PUSCH transmitted in the UL CC 0 is received through a PHICH of the DL CC 0, and ACK/NACK for a PUSCH transmitted in the UL CC 1 is received through an E-PHICH of the DL CC 1. In FIG. 16, the UL grants, the PHICH, and the E-PHICH are indicated in the same subframe for convenience of explanation only, and thus they are not necessarily transmitted simultaneously in the same subframe.

Embodiment 4-3: A PHICH may be used in case of a UL HARQ process scheduled with a PDCCH, and an E-PHICH may be used in case of a UL HARQ process scheduled with an E-PDCCH.

The aforementioned third and fourth embodiments may be used in combination.

A cell/subframe in which the PHICH or the E-PHICH is not transmitted may be allowed not to be a monitoring cell of a UL grant. A cell in which the UL grant is located through either the PDCCH or the E-PDCCH is a cell capable of transmitting ACK/NACK for a PUSCH, and it may be configured such that the UL grant and the PHICH (or E-PHICH) exist in the same cell. This is for configuring a control signal related to UL scheduling in one cell having a good channel state.

In case of an extended carrier (or a new carrier type (NCT)) in which a PDCCH region is not configured, the UL grant may be transmitted through an E-PDCCH. However, if the E-PHICH is not configured in the extended carrier, the UL grant may be subjected to cross-carrier scheduling from a cell in which the PHICH (or E-PHICH) is configured. A DL grant may be subjected to self-carrier scheduling, or the DL grant may be located in the same cell as the UL grant to simplify the scheduling.

In case of a cell in which a subframe having an E-PDCCH and a subframe not having the E-PDCCH co-exist, a method of configuring the E-PHICH may differ according to a state. For example, in case of the subframe having the E-PDCCH, a start OFDM symbol position of the E-PHICH may be set identical to the E-PDCCH, and in case of the subframe not having the E-PDCCH, a corresponding UL HARQ process may be allowed to perform transmission without the PHICH (embodiment 2-4) or may be allowed to use a PHICH of another cell (e.g., a primary cell).

Figure 17:
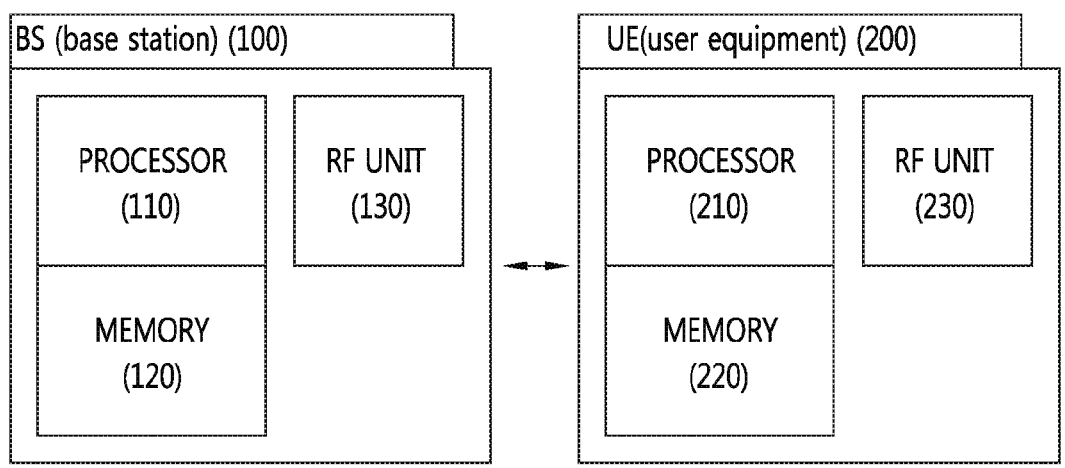
FIG. 17 shows a structure of a base station (BS) and a UE according to an embodiment of the present invention.

FIG. 17 shows a structure of a BS and a UE according to an embodiment of the present invention.

A BS 100 includes a processor 110, a memory 120, and a radio frequency (RF) unit 130. The processor 110 implements the proposed functions, procedures, and/or methods. For example, the processor 110 may allocate a plurality of serving cells to a UE, and may transmit PHICH cell indicator information indicating a PHICH cell by using a higher layer signal. Further, the processor 110 determines whether to perform cross carrier scheduling, and transmits a UL grant through a PDCCH or an E-PDCCH. In addition, the processor 110 receives a PUSCH from the UE, and transmits ACK/NACK for data included in the PUSCH through a PHICH or an E-PHICH. If a rule for a specific cell and channel through which ACK/NACK is transmitted is implicitly predetermined between the BS and the UE, the PHICH cell indicator information may be unnecessary. The memory 120 coupled to the processor 110 stores a variety of information for driving the processor 110. The RF unit 130 coupled to the processor 110 transmits and/or receives a radio signal.

A UE 200 includes a processor 210, a memory 220, and an RF unit 230. The processor 210 implements the proposed functions, procedures, and/or methods. For example, the processor 210 may receive ACK/NACK for PUSCH transmission through a PHICH or an E-PHICH according to the method described above with reference to FIG. 13 to FIG. 16. Optionally, the ACK/NACK may be received by using a DCI format included in the PDCCH or the E-PDCCH instead of an additional channel (i.e., PHICH or E-PHICH). The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for transmitting acknowledgement/not-acknowledgement (ACK/NACK) information to a user equipment (UE) to which a plurality of serving cells are allocated, the method performed by a base station (BS) and comprising:
   receiving, from the UE, uplink data through a physical uplink shared channel (PUSCH) of a first serving cell; and
   transmitting, to the UE, ACK/NACK information for the uplink data through a physical hybrid-ARQ indicator channel (PHICH),
   wherein if the BS configures the UE to receive an uplink grant which schedules the PUSCH through an enhanced physical downlink control channel (EPDCCH) of a second serving cell, the BS transmits the ACK/NACK information through a PHICH of the second serving cell, and
   wherein the EPDCCH is a control channel which is located in a data region.

2. The method of claim 1, wherein the second serving cell is different from the first serving cell.

3. The method of claim 1, wherein the EPDCCH comprises only a UE-specific search space.

4. The method of claim 1, wherein the data region comprises resources where a physical downlink shared channel (PDSCH) can be allocated.

5. A base station (BS) comprising:
   a transceiver for transmitting and receiving a radio signal; and
   a processor operatively coupled to the transceiver,
   wherein the processor is configured to:
   receiving, from the UE, uplink data through a physical uplink shared channel (PUSCH) of a first serving cell; and
   transmitting, to the UE, ACK/NACK information for the uplink data through a physical hybrid-ARQ indicator channel (PHICH),
   wherein if the BS configures the UE to receive an uplink grant which schedules the PUSCH through an enhanced physical downlink control channel (EPDCCH) of a second serving cell, the BS transmits the ACK/NACK information through a PHICH of the second serving cell, and
   wherein the EPDCCH is a control channel which is located in a data region.

6. The BS of claim 5, wherein the second serving cell is different from the first serving cell.

7. The BS of claim 5, wherein the EPDCCH comprises only a UE-specific search space.

8. The BS of claim 5, wherein the data region comprises resources where a physical downlink shared channel (PDSCH) can be allocated.

* * * * *